United States Patent [19]

Tamagawa et al.

[11] Patent Number: 4,830,928

[45] Date of Patent: May 16, 1989

[54] SUPPORT FOR PHOTOGRAPHIC PAPER

[75] Inventors: Shigehisa Tamagawa; Tetsuro Fuchizawa, both of Shizuoka, Japan

[73] Assignee: Fuji Photo Film Co., Ltd., Kanagawa, Japan

[21] Appl. No.: 935,498

[22] Filed: Nov. 26, 1986

[30] Foreign Application Priority Data

Nov. 26, 1985 [JP] Japan .................................. 60-265874

[51] Int. Cl.$^4$ ................................................. B32B 27/08
[52] U.S. Cl. ..................................... 428/511; 428/513; 430/538
[58] Field of Search ................. 478/513, 511; 430/538

[56]  References Cited

U.S. PATENT DOCUMENTS

| | | | |
|---|---|---|---|
| 3,592,731 | 7/1971 | Griggs et al. ........................ | 438/538 |
| 4,331,508 | 5/1982 | Miyama et al. ...................... | 430/538 |
| 4,353,981 | 10/1982 | Noda et al. .......................... | 430/538 |
| 4,407,896 | 10/1983 | Kubbota et al. ..................... | 430/536 |
| 4,410,619 | 10/1983 | Kubbota et al. ..................... | 430/538 |
| 4,434,269 | 2/1984 | Probst et al. ........................ | 428/514 |
| 4,447,524 | 5/1984 | Lino et al. ........................... | 430/538 |
| 4,476,153 | 10/1984 | Kiritani et al. ...................... | 430/538 |
| 4,482,628 | 11/1984 | Katsura et al. ...................... | 430/538 |
| 4,665,014 | 5/1987 | Katsura ............................... | 428/513 |

Primary Examiner—Edith Buffalow
Attorney, Agent, or Firm—Sughrue, Mion, Zinn, Macpeak & Seas

[57] ABSTRACT

A support for photographic paper which has a polyethylene coat formed on both sides of a base paper containing a cationic softening agent. In a preferred embodiment, the base paper is surface-sized. The support has improved surface smoothness.

3 Claims, No Drawings

SUPPORT FOR PHOTOGRAPHIC PAPER

FIELD OF THE INVENTION

The present invention relates to a support for photographic paper and, more particularly, to a support for photographic paper having improved surface smoothness.

BACKGROUND OF THE INVENTION

Water-resistant supports both sides of which are coated with polyethylene have already been commercialized with a view to enabling rapid processing of photographic paper. The currently manufactured and commercially avalable types of photographic paper with a water-resistant support have either a glossy surface or a textured (e.g. matted or silk-finished) surface. The surface configuration or contour of such photographic paper directly reflects the pattern formed on the polyethylene-coated surface of the support on the photographic emulsion side. While various surface configurations are known, a "glossy surface" which is smooth and is not textured at all is most popular and photographic paper with a glossy surface is being sold in larger quantities than any other types of paper. Preferably, photographic paper with a glossy surface has a specularly smooth surface, with a minimum number of fine asperities being present on the image-carrying side.

The present invention relates to a support for photographic paper having improved surface smoothness. The conventional photographic paper using baryta paper as a support is provided with a virtually specular surface by being "ferrotyped" in the drying step which is the final stage of processing. On the other hand, photographic paper using a water-resistant support is finished without being "ferrotyped", so the smoothness of the image-carrying side directly reflects the surface of complete photographic paper which is coated with a photographic emulsion. Since the thickness of the emulsion layer in photographic paper is as small as about 10 microns, the smoothness of the surface of the photographic paper can be regarded as completely identical to that of the support. Therefore, in order to attain an image-carrying side having improved smoothness, the surface of the support must be as smooth as possible.

In producing a water-resistant support, a polyethylene layer is applied most commonly by extrusion coating wherein molten polyethylene is cast onto the surface of a travelling base paper. The present invention relates to a water-resistant support having improved smoothness attained by extrusion coating. It is known that the smoothness of the surface of polyethylene coated paper produced by extrusion coating can be improved by several methods such as increasing the thickness of the polyethylene coat and exerting a greater force of compression during polyethylene coating. But these methods are not highly effective and the cost of their operation is quite high.

The most common method for improving the smoothness of the base paper is to increase its density by exerting a greater pressure in machine calendering, but even this method has the disadvantage that the appearance of the paper is prone to be impaired by such defects as blackening and cockle formation. Therefore, none of the methods so far proposed has succeeded in achieving satisfactory smoothness in the surface of the suppport of photographic paper.

SUMMARY OF THE INVENTION

One object, therefore, of the present invention is to eliminate the aforementioned defects of the conventional methods and to provide a support for photographic paper having improved surface smoothness that is free from such troubles as blackening and cockle formation and which can be manufactured at low cost.

As a result of concerted efforts by the present inventors, these and other objects have been attained by applying a cationic softening agent to the base paper wherein a polyethylene coat is formed on both sides, and preferably by additionally sizing the surface of the paper with polyvinyl alcohol or a denaturated product thereof. The present invention has been accomplished on the basis of this finding.

Accordingly, the present invention relates to a support for photographic paper which has a polyethylene coat formed on both sides of a base paper containing a cationic softening agent.

DETAILED DESCRIPTION OF THE INVENTION

The softening agent used in the present invention is a cationic softening agent that is capable of self-fixing to cellulose. Details of self-fixing cationic softening agents are found in *Shin-Kami Kako Binran* (New Handbook of Paper Processing), pp. 554–555, ed. by Shigyo Times (1980). Cationic softening agents having a molecular weight of at least 200 are preferable. They have a hydrophobic group with 10 or more carbon atoms and also have an amine salt or quaternary ammonium salt which are capable of self-fixing to cellulose. Specific examples of preferable cationic softening agents include: the reaction product of a maleic anhydride copolymer and a polyalkylenepolyamine; the reaction product of a higher aliphatic acid and a polyalkylenepolyamine; the reaction produce of a urethane alcohol and an alkylating agent; and a quaternary ammonium salt of a higher aliphatic acid, as described, for example, in Japanese patent application (OPI) No. 116705/75, (the term "OPI" as used herein means a "published unexamined Japanese patent application"), Japanese patent publication No. 5118/67, *J. Appl. Polym. Sci.*, 9. 2451 (1965) and *J. Oil. Col. Chem. Assoc.*, 53. 363 (1970). Of these compounds, the reaction product of a maleic anhydride copolymer and a polyalkylenepolyamine and that of a urethane alcohol and an alkylating agent are particularly preferable. These softening agents can be applied to the base paper either by internal addition or by surface sizing, the former method being more effective and hence preferable.

The effectiveness of the softening agents will of course increase with the amount added, but if they are added in an excessive amount, the strength of the paper is decreased such as to cause breakage and other troubles and the processing cost is also increased. Therefore, the softening agents are added in amounts ranging from 0.01 to 3.0 wt%, more preferably 0.1 to 1.0 wt%, based on the dry weight of the pulp in the paper support. In order to have the softening agents exhibit their effect in a more efficient manner, they are preferably used in combination with sizing agents. The weight ratio of the softening agent to the sizing agent is preferably from 1/100 to 10/1, more preferably 1/10 to 2/1, from the view point of a balance between the desired effect and a reduction in the strength of the paper.

The base paper used in the present invention is a sheet that is chiefly comprised of wood pulp such as NBKP, LBKP, NBSP or LBSP. If desired, the wood pulp may be mixed with a synthetic fiber such as vinylon or synthetic pulp such as polyethylene. From the view point of flexibility, the water freeness of the pulp is preferably close to that of unbeaten pulp but, in consideration of the desired texture and adaptability to sheet forming, the water freeness of the pulp is preferably within the range of 200 to 500 cc in terms of C.S.F. (Canadian Standard Freeness). Additives such as fillers (e.g. clay, talc, calcium carbonate and the fine particles of urea resin), sizing agents (e.g. rosin, alkyl ketene dimers, higher aliphatic acid salts, paraffin wax and alkenylsuccinic acids) and fixing agents (e.g. aluminum sulfate and cationic polymers) may be added to the base paper as required.

Preferably, the base paper is surface-sized with a film-forming polymer such as gelatin, starch, carboxymethyl cellulose, polyacrylamide, polyvinyl alcohol or a denaturated polyvinyl alcohol. Polyvinyl alcohol and a denaturated polyvinyl alcohol are particularly preferable. Examples of the denaturated polyvinyl alcohol are carboxyl-denaturated polyvinyl alcohol, silanol-denaturated polyvinyl alcohol and a copolymer with acrylamide. These film-forming polymers are applied in coating weights rangin from 0.1 to 5.0 g/m$^2$, preferably from 0.5 to 2.0 g/m$^2$. If necessary, additives such as antistatic agents, brightening agents, pigments and defoamers may be surface-sized together with these film-forming polymers.

A common Fourdrinier paper machine may be used as a sheet-forming apparatus in the present invention. The machine is preferably equipped with a calender before taking up the sheet of paper and surface-sizing thereof. Extrusion coating of a polyethylene layer may be achieved by a common polyethylene extruder and laminator.

The paper in the water-resistant support of the present invention has a basis weight and a thickness of 80 to 200 g/m$^2$ and 80 to 230 microns, respectively. The polyethylene coat formed on both sides of the support has a thickness of 15 to 40 microns per side. The polyethylene coat on the emulsion side contains 5 to 20 wt% of a TiO$_2$ pigment.

The practical and also most precise method of evaluating the smoothness of the water-resistant support and the image-carrying surface of photographic paper is visual checking based on comparison of individual samples.

The following examples are provided for the purpose of further illustrating the present invention but are in no sense to be taken as limiting.

EXAMPLES 1 TO 5

80 wt% of hardwood kraft pulp (LBKP) was mixed with 20 wt% of softwood sulfite pulp (NBSP), and the mixture was beaten to 300 cc in C.S.F. with a disk refiner. Samples of paper stock (Nos. 1 to 5) were prepared by adding various chemicals (for their names and amounts, see Table 1). A sheet having a basis weight of 160 g/m$^2$ and a thickness of 158 μm was formed on a Fourdrinier paper machine from each of the stock samples. With a size press, polyvinyl alcohol (PVA-110 of Kuraray Co., Ltd.) was surface-sized for a deposit of 1.0 g/m$^2$.

The so prepared five samples of base paper (Nos. 1 to 5) were coated with a polyethylene layer of the same composition by extrusion coating with the same laminator. The polyethylene coat on each of the five samples of the water-resistant support had a thickness of 28 μm per side. The cooling roll in the laminator by which the polyethylene layer on the emulsion side would be formed had a specular surface so as to provide gloss on each support. The supports were then coated with a conventional gelatin-dispersed silver halide photographic emulsion and subjected to exposure and development steps. The image-carrying surfaces of the thus obtained samples of photographic paper were visually checked for their relative smoothness: the samples using the base paper Nos. 1 to 3, in accordance with the present invention, exhibited a high level of smoothness but, on the other hand, the samples using the base paper Nos. 4 and 5, comparisons, had a very low level of smoothness and were not commercially acceptable for use as glossy photographic paper.

TABLE 1

| Chemicals | Example No. | | | | |
| --- | --- | --- | --- | --- | --- |
| | Invention | | | Comparison | |
| (wt % based on dry pulp) | 1 | 2 | 3 | 4 | 5 |
| Sodium stearate | 1.3 | 1.3 | 1.0 | 1.3 | 1.0 |
| Aluminum sulfate | 1.5 | 1.5 | 1.0 | 1.5 | 1.0 |
| Polyamidepolyamine-epichlorohydrin resin | 0.3 | 0.3 | 0.5 | 0.3 | 0.5 |
| Alkylketene dimer | — | — | 0.5 | — | 0.5 |
| Maleic anhydride based softening agent* | 0.6 | — | 0.4 | — | — |
| Urethane-based softening agent** | — | 0.6 | — | — | — |

*GZ-1600 of Hamano Industry Co., Ltd.
**Softness KM of Lion Corp.

While the invention has been described in detail and with reference to specific embodiments thereof, it will be apparent to one skilled in the art that various changes and modifications can be made therein without departing from the spirit and scope thereof.

What is claimed is:

1. A support for photographic paper comprising a base paper having a polyethylene coat formed on both sides thereof, wherein said paper contains a cationic softening agent which is the reaction product of a maleic anhydride copolymer and a polyalkylene-polyamide or the reaction product of urethane alcohol and an alkylating agent or both.

2. A support for photographic paper of claim 1, wherein said base paper containing a cationic softening agent is surface-sized with a sizing agent selected from the group consisting of polyvinyl alcohol and a denaturated product of polyvinyl alcohol.

3. A support for photographic paper of claim 1, wherein said base paper containing a cationic softening agent is surface-sized.

* * * * *